United States Patent [19]

Simpson et al.

[11] Patent Number: 4,620,397
[45] Date of Patent: Nov. 4, 1986

[54] ROOF SYSTEM POSITIONABLE OVER AN EXISTING ROOF STRUCTURE AND METHOD FOR INSTALLING SAME

[75] Inventors: Harold G. Simpson, Oklahoma City; Leo E. Neyer, Edmond, both of Okla.

[73] Assignee: Harold Simpson, Inc., Oklahoma City, Okla.

[21] Appl. No.: 713,319

[22] Filed: Apr. 22, 1985

Related U.S. Application Data

[60] Division of Ser. No. 487,614, Apr. 22, 1983, Pat. No. 4,520,610, and a continuation-in-part of Ser. No. 503,299, Jun. 10, 1983, Pat. No. 4,534,148, and a continuation-in-part of Ser. No. 428,568, Sep. 30, 1982, and a continuation-in-part of Ser. No. 306,662, Sep. 29, 1981, Pat. No. 4,524,544, and a continuation-in-part of Ser. No. 121,920, Feb. 15, 1980, Pat. No. 4,361,993, and a continuation-in-part of Ser. No. 93,173, Nov. 13, 1979, Pat. No. 4,329,823.

[51] Int. Cl.[4] ............................................. E04B 1/346
[52] U.S. Cl. .................................. 52/66; 52/90; 52/640
[58] Field of Search ............... 52/22, 66, 90, 639, 52/640, 641, 741, 745, 11–16, 690–692

[56] References Cited

U.S. PATENT DOCUMENTS

| 1,918,346 | 7/1933 | McHose | 52/734 |
| 3,740,917 | 6/1973 | Wong | 52/694 |
| 4,106,256 | 8/1978 | Cody | 52/646 |

FOREIGN PATENT DOCUMENTS

| 2330824 | 7/1977 | France | 52/693 |
| 927434 | 5/1963 | United Kingdom | 52/13 |
| 1502137 | 2/1978 | United Kingdom | 52/11 |
| 1513762 | 6/1978 | United Kingdom | 52/13 |
| 632806 | 11/1978 | U.S.S.R. | 52/13 |

Primary Examiner—Carl D. Friedman
Assistant Examiner—Naoko N. Slack
Attorney, Agent, or Firm—Bill D. McCarthy

[57] ABSTRACT

A roof system positionable over an existing roof wherein the roof system is formed of at least one roof section. The roof section includes (a) a plurality of adjustable trusses disposed along a preselected section of the existing roof, each of the trusses having a lower cord, a spatially disposed upper cord and an adjustable web assembly interconnecting the lower cord and the upper cord, the lower cord of each truss disposed substantially adjacent the existing roof such that the trusses extend upwardly from the existing roof in a substantially parallel relationship with the adjacently disposed trusses, the web assembly of each of the trusses being adjustable such that the upper cord of each of the trusses is substantially horizontally disposed a selected predetermined height above the existing roof and independent of the slope of the existing roof and the position of the lower cord; (b) truss fastener members for connecting the lower cord of each of the trusses to the existing roof; (c) at least one roof panel member supported by the upper cords of the trusses, the roof panel member being disposed to substantially traverse the upper cords of the trusses; and (d) fastener members for connecting the roof panel member to the upper cords of the trusses to form the roof system having a predetermined roof plane substantially independent of the plane of the existing roof. The roof system is further provided with gutter assemblies. A method for installing the roof system over an existing roof is also provided.

18 Claims, 10 Drawing Figures

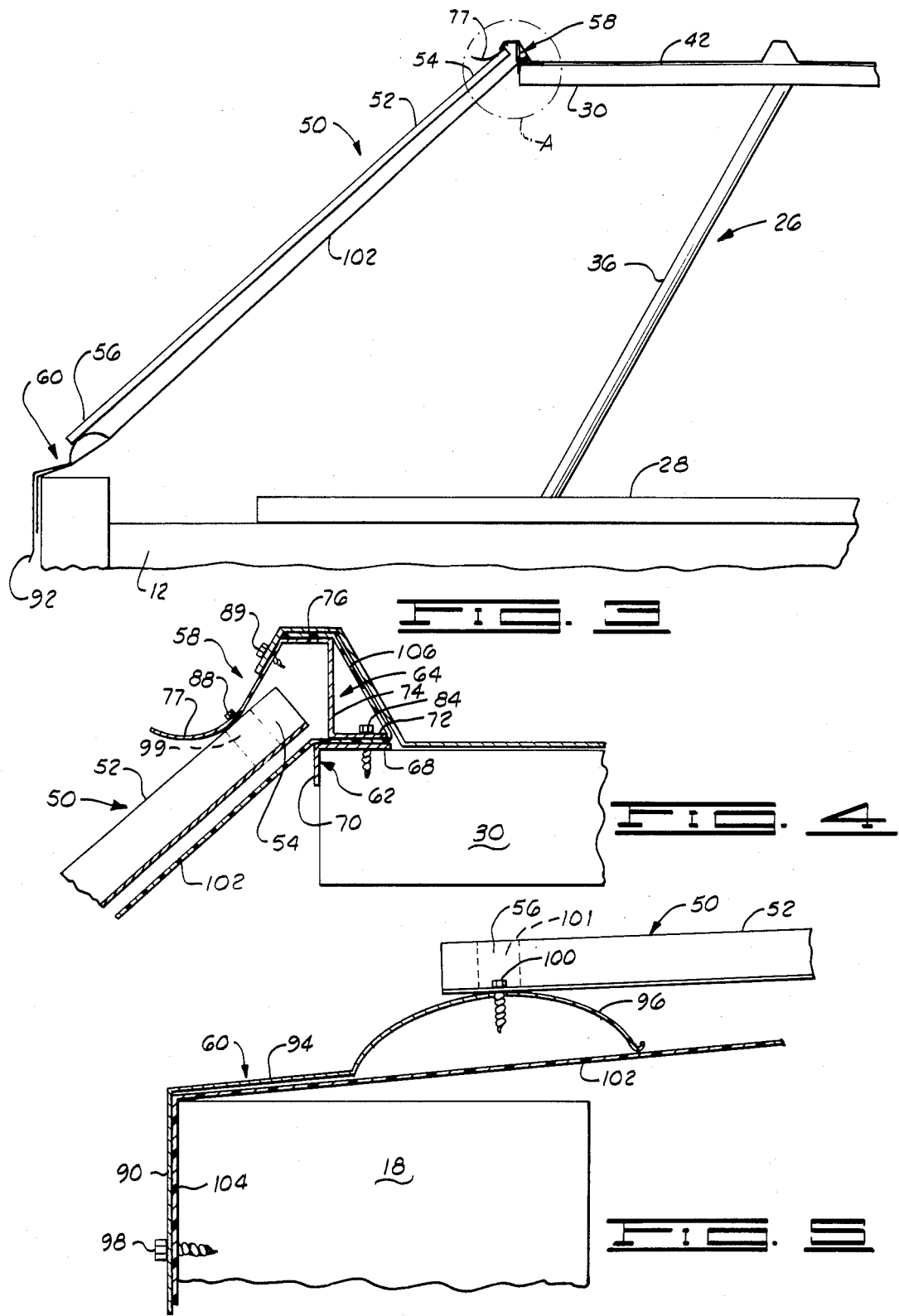

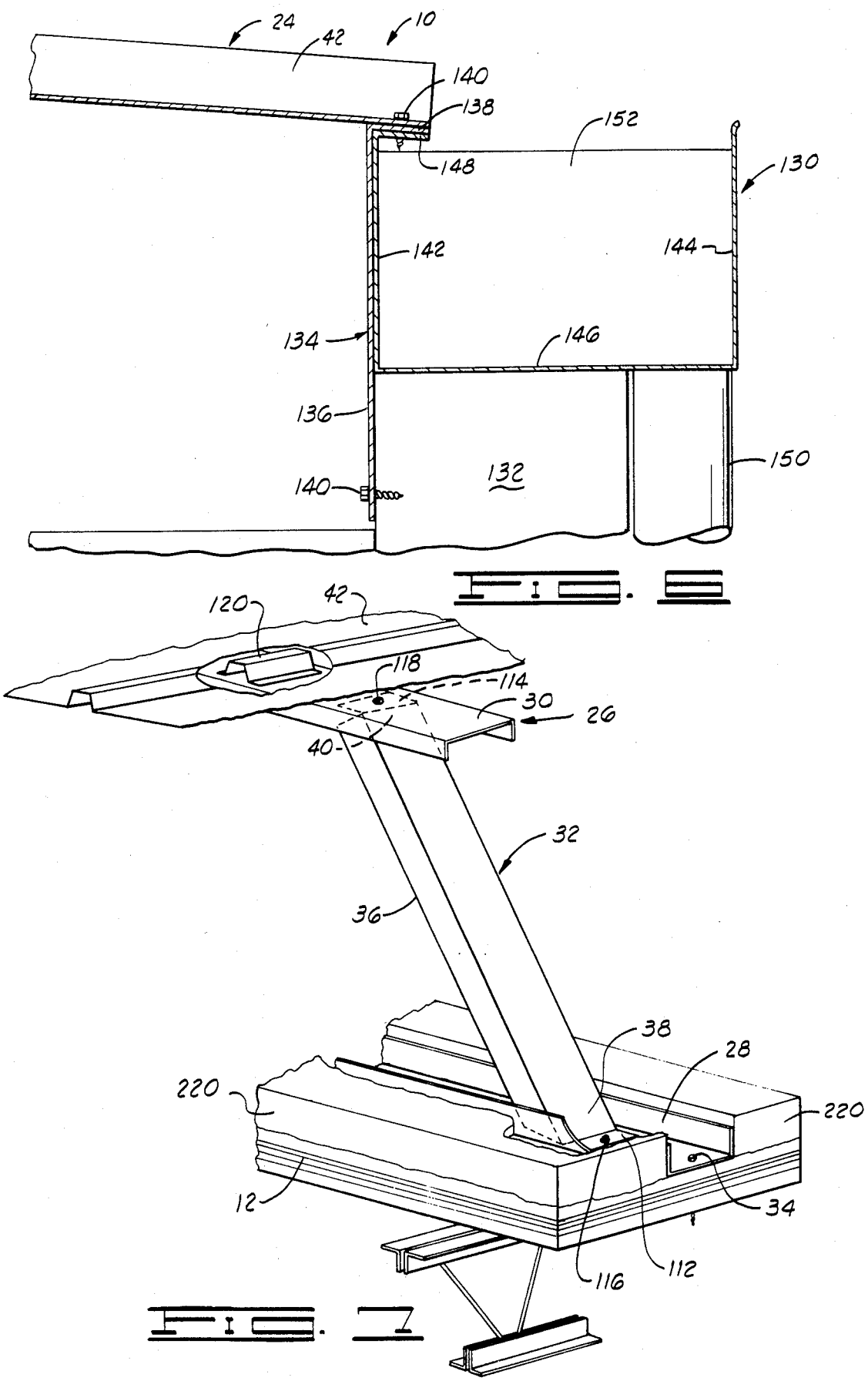

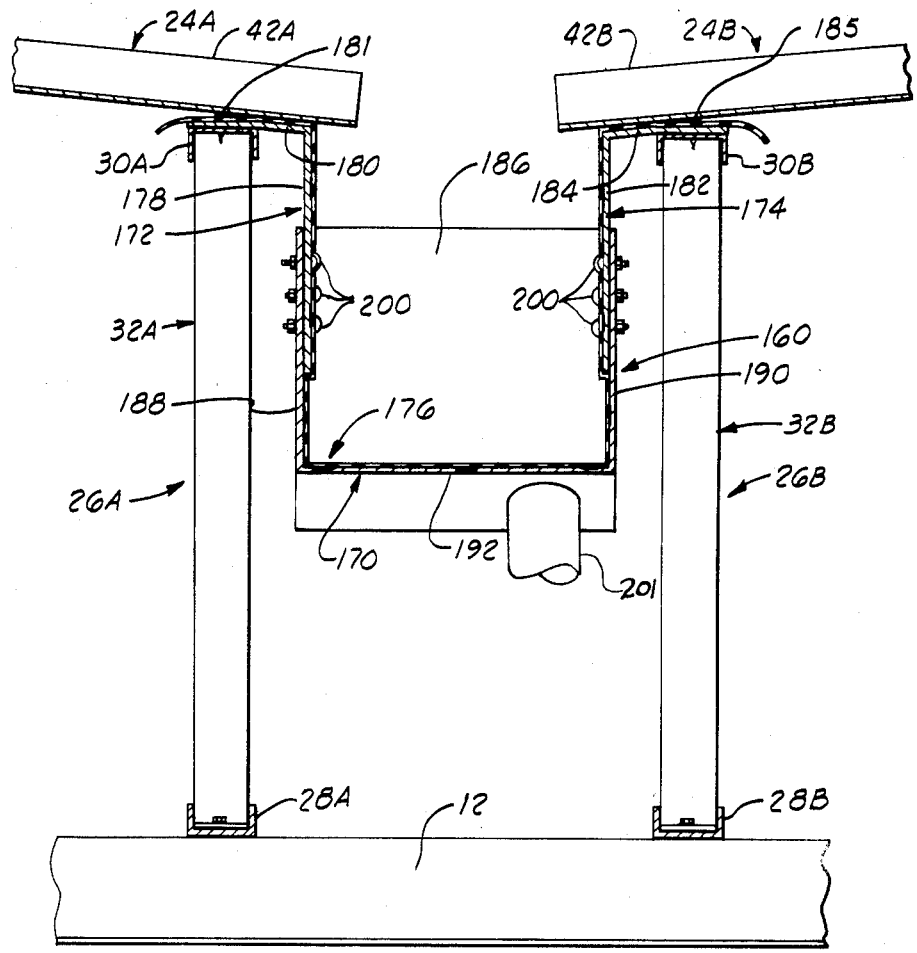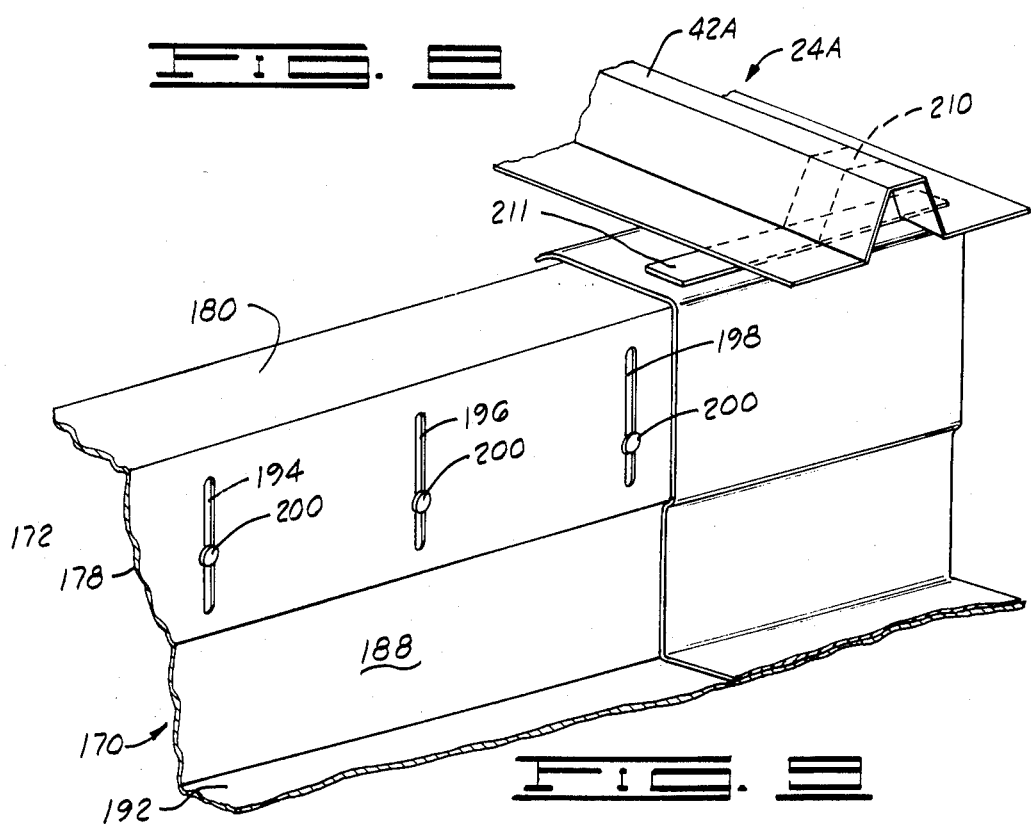

ROOF SYSTEM POSITIONABLE OVER AN EXISTING ROOF STRUCTURE AND METHOD FOR INSTALLING SAME

CROSS REFERENCE TO RELATED APPLICATIONS:

This is a divisional application to U.S. patent application entitled "A Method for Installing a Roof System Positionable Over An Existing Structure", Ser. No. 487,614 filed Apr. 22, 1983, now U.S. Pat. No. 4,520,610.

This is a continuation-in-part application to:

U.S. patent application entitled "Adjustable Roofing Support Spacer Apparatus and Erection Method", Ser. No. 503,299 filed June 10, 1983, now U.S. Pat. No. 4,534,148;

U.S. patent application entitled "Roof Clip Assembly for a Roof System", Ser. No. 428,568 filed Sept. 30, 1982, now pending;

U.S. patent application entitled "Structural Bracing System", Ser. No. 306,662 filed Sept. 29, 1981, now U.S. Pat. No. 4,524,544;

U.S. patent application entitled "Frameless Enclosure", Ser. No. 121,920 filed Feb. 15, 1980, now U.S. Pat. No. 4,361,993; and U.S. patent application entitled "Support Spacer Apparatus", Ser. No. 093,173 filed Nov. 13, 1979, and now U.S. Pat. No. 4,329,823.

BACKGROUND

1. Field of the Invention

The present invention relates to a roofing system for a building structure, and more particularly but not by way of limitation, to an improved roofing system positionable over an existing roof. In one aspect, the invention relates to a method for installing a roof system over a substantially flat existing roof structure to form a new roof system having a desired planar surface substantially independent of the planar surface of the existing roof structure.

2. Discussion of Prior Art

Numerous types of roof assemblies have heretofore been proposed for buildings in an effort to provide a watertight roof assembly, while at the same time enabling the roof assembly to expand and contract as changes in temperature are encountered. One particular type of roof assembly heretofore used is a substantially flat roof assembly referred to in the construction industry as a "built-up" roof. Generally such a roof assembly is formed of a plurality of sections which are interconnected and/or overcoated wtih asphaltic composition to provide a watertight seal. While such roof assemblies have met with general success, problems have nevertheless been encountered in that as the roof assembly ages, or the building settles, or as a result of construction errors the drainage slope of the roof assembly often results in water standing in pockets throughout the roof assembly. This standing water often results in deterioration of the roof assembly causing leaks and the like to occur.

In an effort to repair a substantially flat roof assembly which has been damaged by the elements, or developed leaks therein, problems have been encountered in repairing the roof assembly in a satisfactory manner to prevent similar occurrences from happening. Thus, a need has long been recognized for a roof assembly for substantially reroofing a building which does not require substantial modifications to the existing roof assembly and which is economically both in fabrication and construction. Further, it is highly desirable that the new roof assembly be capable of altering the planar surface of the roof assembly of the building independent of the variations in the planar surface of the existing roof assembly. Past repair methods especially those capable of altering the planar surface to improve the drainage characteristics of the building have required substantial destruction of the original roof thus exposing the building and its contents to damage by the elements during the reroofing process.

SUMMARY OF THE INVENTION

The present invention relates to an improved roof system positionable over an existing roof of a structure without substantial modifications or destruction of the existing roof. Broadly, the improved roof system comprises a plurality of adjustable trusses disposed along at least a portion of the existing roof of the structure, each of the trusses having a lower cord, a spatially disposed upper cord and an adjustable web assembly interconnecting the lower cord and the upper cord. The lower cord of each truss is disposed substantially adjacent the existing roof of the structure and connected thereto such that the trusses extend upwardly from the existing roof in a substantially parallel relationship with the adjacently disposed trusses. The web assembly of each of the trusses is adjustable so that the upper cord of each truss is coplanarly disposed a selected predetermined height above the existing roof and independent of the planar surface of the existing roof. At least one roof panel member is positioned over the upper cord of the trusses and secured thereto such that the trusses and the roof panel member cooperate to form the improved roof system having a predetermined planar surface substantially independent of the planar surface of the existing roof.

In another aspect the present invention relates to an improved roof assembly positionable over an existing roof wherein the roof system is formed of a plurality of roof sections, each of the roof sections providing an independent planar surface such that upon intersection of adjacent roof sections a pitched roof system is formed. A gutter assembly is disposed between and connected to adjacently disposed roof sections where such sections form valleys so that water can readily be drained from the improved roof system.

An object of the present invention is to provide an improved roof system positionable over an existing roof which does not require substantial modification or damage to the existing roof.

Another object of the present invention, while accomplishing the above stated object, is to provide an improved roof system positionable over an existing roof wherein the improved roof system is not limited in design and configuration by the existing roof.

Another object of the present invention, while achieving the above stated objects, is to provide an improved roof system for reroofing an existing structure which is substantially independent of the planar surface of the existing roof.

Another object of the present invention, while achieving the above state objects, is to provide an improved roof system for reroofing an existing structure which is substantially free to move independently of the existing roof as the two roofs expand and contract because of building movement, temperature changes and similar forces.

Still another object of the present invention, while achieving the above stated objects, is to provide an improved roof system positionable over an existing roof to replace the existing roof which does not suffer from the disadvantages of existing reroofing procedures and assemblies.

Another object of the present invention, while achieving the above stated objects, is to provide a means of connecting the improved roof system to the existing building structure to extend the improved roof systems water tightness to the existing building structure.

Other objects, features and advantages of the present invention will become clear from a reading of the following detailed description when read in conjunction with the drawings and the appended claims.

BRIEF DESCRIPTION OF THE DRAWINGS

FIG. 3 is an enlarged, partially broken sectional view of the roof system of the present invention taken at 3—3 in FIG. 1.

FIG. 4 is an enlarged, partially broken sectional view showing the interconnection of flashing to a roof panel of the roof system of the present invention and area A in FIG. 3.

FIG. 5 is an enlarged, partially broken sectional view showing the interconnection of the flashing to a wall of the roof system of the present invention.

FIG. 6 is an enlarged, partially broken sectional view of the roof system of the present invention taken at 6—6 in FIG. 1.

FIG. 7 is an enlarged, partially broken isometric view of the adjustable truss of the roof system of the present invention.

FIG. 8 is an enlarged, partially broken cross-sectional view of a portion of the roof system constructed in accordance with the present invention and illustrating a gutter assembly.

FIG. 9 is a partially broken isometric view of the roof system and gutter assembly of FIG. 8.

DESCRIPTION

Figure 1:
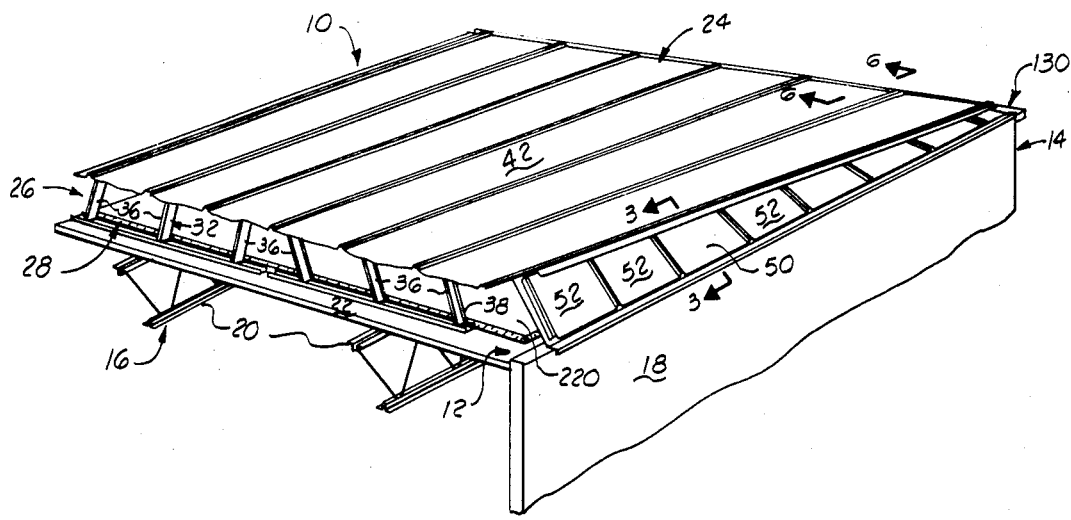
FIG. 1 is a partially broken, isometric view of a structure showing a portion of a roof system constructed in accordance with the present invention positioned over an existing roof of the structure.

Referring now to the drawings, and more particularly to FIG. 1, a portion of an improved roof system 10 of the present invention is supported by an existing roof 12 of a building structure 14. The existing roof 12 of the building structure 14 can be any suitable substantially flat roof structure, such as a built up roof, which is connected to and supported by conventional elements, such as a primarily structural system (not shown), a secondary structural system 16 and a plurality of wall members 18 (only one being shown). The primary structural system of the building structure 14 will generally consist of a plurality of upwardly extending column members that are rigidly connected to a foundation and a plurality of primary beams which are generally horizontally disposed and supported by the column members. The secondary structural system 16 comprises a plurality of open web beams or trusses 20, also referred to as bar joists, which are supported by the primary beams and walls of the building structure 14. The web beams or trusses 20 are also generally horizontally disposed. While Z or C purlins or wood beams could as well be used as the secondary structural members in the formation of the existing roof 12 of the building structure 14, the present invention will be described with reference to an existing roof 12 wherein the secondary structural members 16 are bar joists 20 as shown in FIG. 1.

As previously stated, the existing roof 12 is a substantially flat roof structure and can be any roof structure heretofore known in the art, such as a built up roof structure. The term "substantially flat roof structure" as used herein is to be understood to mean a roof structure having a general appearance of a flat planar surface, even when such roof structure contains slight variations or recessed areas as a result of design (i.e. to provide a drainage system for water collecting on the roof structure) construction errors or by settling of the building structure.

The improved roof system 10 will generally be formed of a plurality of roof sections, such as section 24 illustrated in FIG. 1. The roof sections of the improved roof system 10 are connected to provide a roof plane for the improved roof system 10 having a desired configuration. For example, the roof sections of the improved roof system 10 can be disposed on the existing roof 12 such that upon intersection of adjacent roof sections a pitched roof is formed. On the other hand, the roof sections can be joined such that the improved roof system 10 is provided with a substantially single roof plane, i.e. a roof plane having a unidirectional slope.

Each of the roof sections forming the roof system 10 are substantially identical in construction. Thus, only the roof section 24 illustrated in FIG. 1 will be described in detail. The roof section 24 of the improved roof system 10 comprises a plurality of adjustable trusses 26 (only one being shown) disposed along the upper side or surface 22 of the existing roof 12 of the building structure 14 so that each of the trusses 26 extend upwardly from the existing roof 12 in a substantially parallel relationship with the adjacently disposed trusses 26 of the roof section 24.

Figure 2A:
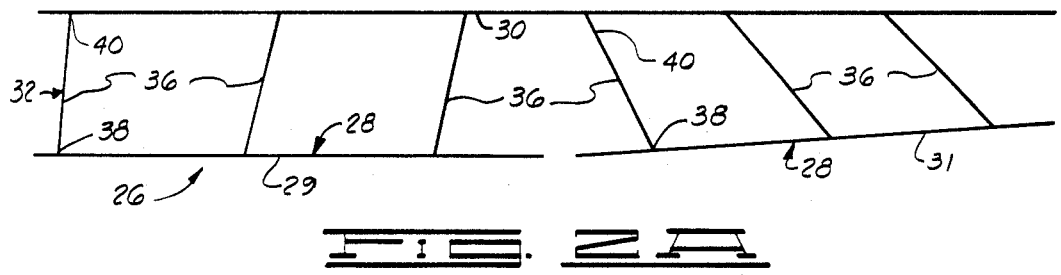
FIG. 2A is a schematic line drawing of an adjustable truss constructed in accordance with the present invention wherein the upper and lower cords of the truss are in a substantially non-parallel relationship when the truss is in the assembled position.
Figure 2B:
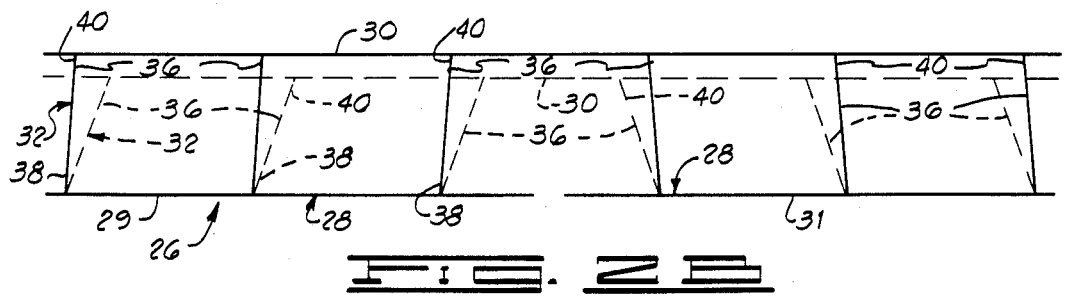
FIG. 2B is a schematic line drawing of an adjustable truss constructed in accordance with the present invention wherein the upper and lower cords of the truss are in a substantially parallel relationship when the truss is in an assembled position.

Referring now to FIGS. 1, 2A and 2B, each of the adjustable trusses 26 is characterized as having a lower cord 28, a spatially disposed upper cord 30 and an adjustable web assembly 32 interconnecting the lower cord 28 and the upper cord 30. The lower cord 28 may be formed as a continuous segment or as a plurality of segments as shown in the drawing. When the lower cord 28 is formed of a plurality of segments, such as segments 29 and 31, the lower cord 28 is adapted to more readily fit the contour of the existing roof 12. The web assembly 32 of each of the adjustble trusses 26 is connected to the lower and upper cords 28, 30 at various positions so that the upper cord 30 of each of the adjustable trusses 26 is substantially horizontally disposed a selected predetermined height above the lower cord 28 (and thus the upper side or surface 22 of the existing roof 12) independent of slope or irregularities that may be present in the existing roof 12. For example, in FIG. 2A the line drawing illustrates the adjustable feature of the adjustable truss 26 where the upper cord 30 is substantially horizontally disposed in a substantially non-parallel relationship with the lower cord 28 at a predetermined height. In FIG. 2B the line drawing illustrates the adjustable feature of the adjustable truss 26 when the upper cord 30 is substantially horizontally disposed in a parallel relationshp with the lower cord 28 at a first predetermined height; whereas the phantom line drawing illustrates the adjustable truss 26 wherein the upper cord 30 is secured in a substantially parallel relationship with the lower cord 28 at a second predetermined height. It is to be understood that the distance between the lower and upper cords 28, 30 of the adjustable trusses 26 can be varied between the geometrical limits of the adjustable web assembly 30.

The lower cord 28 of each of the adjustable trusses 26 in the roof section 24 are secured to the existing roof 12 via the upper side or surface 22 thereof by any suitble truss fastener assembly known in the art such as a plurality of self-tapping screws, one such self-tapping screw 34 for securing the lower cord 28 to the existing roof 12 is shown in FIG. 7.

The web assembly 32 of the adjustable trusses 26 comprises a plurality of spacer trusses 36 having a first end portion 38 and an opposed second end portion 40. The first end 38 of each of the spacer trusses 36 is secured to the lower cord 28 of the adjustble trusses 26 and the opposed second end 40 of the spacer trusses 36 is secured to the upper cord 30. The angular disposition of the spacer trusses 36 of the web assembly 32 of the adjustable trusses 26 is such that the upper cord 30 is maintained in a proper, predetermined relationship with the lower cord 28 and thus the existing roof 12 of the building structure 14. The upper cord 30 of each of the adjustable trusses 26 in adjacent roof sections 24 may be secured via their adjacently disposed ends by any suitable means known in the art.

A plurality of roof panel members 42 are positioned upon and supported by the upper cord 30 of the adjustable trusses 36 so as to substantially extend across and from a continuous plane across the upper cords 30. The roof panel members 42 are secured to the upper cords 30 of the adjustable trusses in such a manner that the roof system 10 is provided with a predetermined plane substantially independent of the plane of the existing roof 12. Any suitable panel fastener assemblies can be employed for connecting the roof panel members 42 to the upper cords 30 of the adjustable trusses 26, such as self-drilling, self-tapping screws heretofore known in the art and employed in the assembly of roof panels in standing seam and standard corrugated roof assemblies and the like.

The improved roof system 10 further comprises a flashing assembly 50 for interconnecting a wall member of the building structure 14, such as the wall member 18, to the adjacently disposed roof panel members of the roof section, such as the roof panel member 42 of the roof section 24. The flashing assembly 50 is desirably formed of a plurality of facade panel members 52 which are interconnected so as to extend substantially along the length of the roof section and provide a substantially continuous surface along the length of the roof section 24 of the building surface 14 as shown in FIG. 1.

Referring now to FIGS. 3, 4 and 5 the construction of the flashing assembly 50 and the connection of the facade panel members 52 to the wall members of the building structure 14, such as the wall member 18, and the adjacently disposed roof panel members of the roof section, such as the roof panel member 42 of the roof section 24, is illustrated in more detail. Each of the facade panel members 52 is provided with an upper end 54 and an opposed lower end 56. The upper end 54 of each of the facade panel members 52 is connected to the adjacently disposed edge portion of a roof panel member, such as the adjacent edge portion of the roof panel member 42, via a roof connector assembly 58; and the lower end 56 of each of the facade panel members 52 is connected to the upper end portion of an adjacent wall member of the building structure 14, such as the upper end portion of the wall member 18, via a wall connector assembly 60.

Referring now to FIGS. 3 and 4, the roof connector assembly 58 comprises a truss spanner member 62 and a support member 64. The truss spanner member 62, a substantially L-shaped member having a first leg portion 68 and a substantially normally disposed second leg portion 70, is positioned over the end portions of the upper cord 30 of each of the aligned adjustable trusses 26 in the roof section 24 so as to extend across the upper cord 30 of each of the adjustable trusses 26 in the roof section 24. The first leg portion 68 of the truss spanner member 62 is disposed substantially adjacent the upper surface of each of the upper cords 30 so that the second leg portion 70 abutts the end of each of the upper cords 30 of the adjustable trusses 26 in the roof section 24 substantially as shown in the drawings. The support member 64 comprises a first leg portion 72, a body portion 74, a second leg portion 76, a flashing member 77 is formed on the second end portion 76 of the support member 64, the flashing member 77 being an arcuate shaped member. The first leg portion 72 of the support member 64 is positioned over the first leg portion 68 of the truss spanner member 62 so that the body portion 74 of the support member 64 is substantially normally disposed to the longitudinal axis of the upper cords 30, and the second end portion 76 of the support member 64 extends outwardly from the ends of the upper cords 30 of the adjustable trusses 26. The length of the support member 64 substantially corresponding to the length of the truss spanner member 62 so that the support member 64 extends across the end portions of each of the upper cords 30 of the adjustable trusses 26 forming the roof section 24.

The first leg portion 68 of the truss spanner member 64 and the second leg portion 76 of the support member 64 are secured to the upper cords 30 of the adjustable trusses 26 forming the roof section 24 by any suitable means, such as by a self-drilling, self-tapping screw 84. The upwardly turned arcuate shaped flashing member 77 is connected to the upper end 54 of the facade panel members 52 of the flashing assembly 50 by any suitable means, such as a self-drilling, self-tapping screw 88. The connection of the truss spanner member 62, the support member 64 and the arcuate shaped flashing member 77 as described above enables one to readily connect the upper end 54 of the facade panel members 52 of the flashing assembly 50 to the upper cords 30 of the adjustable truss 26 forming the roof section 24. Further, the upwardly turned arcuate shaped flashing member 77 formed as a part of support member 64 of the roof connector assembly 58 in combination with the wall connector assembly 60 enables the lower end 56 of the facade panel members 52 to be connected to the upper end portions of the adjacent wall members, such as the upper end portion of the wall member 18 regardless of the angular disposition of the facade panel members 52. Once the facade panel members 52 have been connected to the upper cords 30 of the adjustable trusses 26 of the roof section 24 via the roof connector assembly 58 as heretofore described, the roof panel member 42 can be disposed over the roof connector assembly 58 and connected thereto by any suitable means, such as self-tapping, self-drilling screw 89, to provide the improved roof system 10.

Referring now to FIGS. 3 and 5 the wall connector assembly 60 for connecting the lower end 56 of each of the facade panel members 52 of the flashing assembly 50 to the upper end portion of the wall members of the building structure 14, such as the upper end of the wall member 18 is illustrated. The wall connector assembly 60 comprises a connector plate 90 having a first end portion 92, a body portion 94, and a downwardly curved second end portion 96. The connector plate 90 is positioned over the wall member of the building structure 14, such as the wall member 18, so that the first end portion 92 abutts the wall 18 and is connected thereto by any suitable means, such as screw 98. The body portion 94 and the downwardly curved end portion 96 of the connector plate 96 are disposed above the upper end portion of the wall member 18, preferably in a spatial relationship therewith as shown in FIG. 5 of the drawings. The lower end 56 of each of the facade panel members 52 of the flashing assembly 50 is connected to the downwardly curved end portion 96 of the connector plate 90 by any suitable means, such as self-drilling, self-tapping screw 100. The unique configuration of the connector plate 90, including the downwardly curved end portion 96, in combination with the configuration of the arcuate shaped flashing member 77 formed on the second end portion 76 of the support member 64 of the roof connector assembly 58, enables one to connect the facade panel members 52 to the adjacent roof panel 40 and to the upper end portion of the wall members of the building structure 14, such as the wall member 18. For example, the particular angular position of each of the facade panel members 52 can vary along the length of the roof section 24 because of the degree of extension of the adjustable trusses 26, and the elevation of the roof section 24 above the upper end portion of the wall members of the building structure 14, such as the wall member 18. When the facade panel members 52 are constructed of corrugated materials (as illustrated), plugs, such as plug member 99 and 191 indicated in phantom in FIG. 4 and 5, are positioned within the voids found by interconnection of the corrugations of the facade panel members 52.

The flashing assembly 50 heretofore described provides a unique method for interconnecting the roof panel members 40 of the roof section 24 to the upper end portion of the supporting wall members of the building structure 14, such as the wall member 18. However, when the assembled facade panel members 52 of the flashing assembly 50 are subjected to temperature variations, the facade panel members 52 tend to expand and contract. The expansion and contraction of the facade panel members 52 or construction errors may result in a partial separation of the joints formed between adjacent facade panel members 52 of the flashing assembly 50 of the improved roof system 10. Thus, the flashing assembly 50 desirably further comprises a plastic membrane 102 disposed under the facade panel members 52 and extending between the roof panel member 40 and the adjacent wall member of the building structure 14, such as the wall member 18. The plastic membrane 102 functions as an internal gutter system to prevent water and moisture from collecting under the improved roof system 10 due to defects in the construction of the flashing assembly 50 or partial separation of the joints formed between the adjacent facade panel members 52 of the flashing assembly 50 as a result of expansion or contraction or construction error of the facade panel members 52. To secure the flexible membrane 102 in position below the facade panel members 52, one end portion 104 of the plastic membrane 102 is positioned adjacent the upper end portion of the wall member of the building structure 14, such as the wall member 18 and secured thereto via the connector plate 90 and the screw 98 of the wall connector assembly 60 as heretofore described. The plastic membrane is then stretched taut and a second end 106 of the plastic membrane is disposed over the truss spanner member 62 and secure thereto via the support member 64 and the self-drilling, self-tapping screw 84. The second end portion 106 of the plastic membrane 102 is then lapped over the support member 64. The plastic membrane 102, desirably a flexible plastic membrane, is disposed below the facade panel members 52 in a spatial relationship with the facade panel members 52 so that the facade panel members 52 do not contact and tear the plastic membrane 102.

As previously stated the improved roof system 10 of the present invention employs adjustable trusses 26 capable of being selectively adjusted to provide a desired planar surface for the roof panel members 42 independent of the planar surface of the existing roof 12 on which the improved roof system 10 is secured. Referring now to FIG. 7, the connection of the spacer trusses 36 of the web assembly 32 to the lower cord 28 and the upper cord 30 of the adjustable trusses 26 of the improved roof system 10 are shown in detail. The web assembly 32 comprises a plurality of spacer trusses 36 which are identical in construction. Thus, one spacer truss 36 is illustrated in FIG. 7. However, it should be noted that the angular disposition of the spacer trusses may be different for each spacer truss, and that the angular disposition of the spacer trusses will be dependent upon the desired height of the upper cord 30 of the adjustable truss 26, the relationship of the upper cord 30 to the lower cord 28, and the plane of the existing roof 12.

The lower and upper cords 28, 30 of the adjustable truss 26 are illustrated as channel members, the channel portion of the lower cord 28 adapted to receive the opposed second end portion 40 of the spacer truss 36. The spacer truss 36, also a channel member further comprises a flange member 112 formed on the first end portion 38 thereof; and a flange member 114 formed on the opposed second end portion 40 thereof. The first end portion 38 of the spacer truss 36 the is secured to the lower cord 28 of the adjustable truss 26 via the flange member 112 and a self-tapping, self-drilling screw 116. The opposed second end portion 40 of the spacer truss 36 is secured to the upper cord 30 of the adjustable truss 26 via the flange member 114 and a self-tapping, self-drilling screw 118. The opposed second end portion 40 of the spacer truss 36 is skewed up to about fifteen degrees so that in the assembled position of the lower cord 28, the upper cord 30 and the spacer truss 36 of the web assembly 32, the upper cord 30 can be maintained in a substantially predetermined relationship with the lower cord 28 and disposed substantially above the lower cord 28 independent of the planar surface of the existing roof 12. As previously stated, each of the spacer trusses 36 forming the web assembly 32 of the adjustable truss 26 is positioned independently of the adjacent spacer trusses so that the desired relationship between the lower and upper cords 28, 30 of the adjustable truss 26 is maintained.

When the adjustable truss 26 has been properly positioned on the existing roof 12 so that the upper cord 30 of the adjustable truss 26 is disposed in the predetermined position and each of the adjacent adjustable trusses 26 have likewise been so positioned, the roof panel member 42 is positioned on the upper cord 30 of the adjustable trusses 36 and secured thereto by any suitable means, such as a corrugation support clip 120 and suitable fastening means, such as self-drilling, self-tapping screws (not shown).

Referring now to FIG. 6 the eave portion of the improved roof system 10 of the present invention is illustrated in combination with an external gutter assembly 130. The eave portion of the roof section, such as roof section 24, is connected to the top portion of a wall member of the building structure 14, such as an end wall member 132 via an eave connector assembly 134. The eave connector assembly 134 is a plate member having a first leg portion 136 and a second leg portion 138. The first leg portion 136 is disposed adjacent to the intertior upper portion of the end wall member 132 and secured thereto by any suitable means, such as self-tapping, self-drilling screw 140 or power driven shot pin so that the second leg portion 138 is disposed above the end wall member 132 and abuts and supports the eave portion of the roof section 24 substantially as shown. The roof section 24, which comprises a plurality of roof panel members, such as roof panel member 42, can be connected to the second leg portion of the eave connector assembly 134 by any suitable means, such as self-tapping, self-drilling screw 140.

The external gutter assembly 130, a trough member extending the length of the eave portion of the roof section 24, comprises a first side 142, a spatially disposed second side 144, a bottom plate 146 interconnecting the first and second sides 142, 144, and an upper flange 148 connected to the upper end of the first side 142 and disposable adjacent the second leg portion 138 of the eave connector assembly 134. The external gutter assembly 130 is positioned upon and supported by the upper end portion of the end wall 132 and secured to the second leg portion 138 of the eave connector assembly 134 via the self-tapping, self-drilling screw 140. The external gutter assembly 130 further comprises a down spout 150 connected the bottom plate 146 at a position external the end wall member 132, the down spout 150 openly communicating with an opening (not shown) in the bottom plate 146 so that water collected by the trough member of the external gutter assembly 130 can be removed therefrom via the opening (not shown) and the down spout 150. The external gutter assembly 130 is further provided with end cap plates, such as end cap plate 152 for closing off the ends of the trough member.

The improved roof system 10 of the present invention has been described above with reference to a roof section 24 having a unidirectional slope substantially as shown in FIG. 1. However, in many instances it is desirable that the improved roof system be constructed such that a plurality of roof sections are connected to form pitched and/or pyramid shaped roof surfaces. In such instances it is desirable that the eave portion of each adjacent roof section be provided with an internal gutter assembly to ensure proper removal of water from the roof system. It should be noted that when employing multi-roof sections to form the roof structure having a plurality of pitches or a pyramid shape the components of the roof system and construction of same is substantially identical to that heretofore described with reference to FIGS. 1–5 and 7 with the exception of the internal gutter assembly.

Referring now to FIG. 8 an internal gutter assembly 160 for the improved roof system 10 of the present invention is illustrated. In this embodiment the eave portion of two roof sections 24A and 24B are supported in a facing, spatially disposed configuration via adjustable trusses 26A and 26B, respectively. The adjustable trusses 26A and 26B are substantially identical in construction to the adjustable truss 26 heretofore described in detail. Thus, the adjustable truss 26A comprises a lower cord 28A, an upper cord 30A, and a web assembly 32A interconnecting the lower cord 28A and the upper cord 30A. Likewise, the adjustable truss 26B comprises a lower cord 28B, an upper cord 30B and a web assembly 32B interconnecting the lower cord 28B and the upper cord 30B. The internal gutter assembly 160 comprises a gutter pan 170, a first gutter support member 172, a second gutter support member 174, and a liner member 176. The first gutter support member 172 is a substantially L-shaped member having a first leg 178 and a substantially normally disposed second leg 180. The second leg 180 of the first gutter support member 172 is positioned over the upper cord 30A of the adjustable truss 26A and secured thereto by any suitable means such as a self-tapping, self-drilling screw 181 so that the first leg 178 of the gutter support member extends in a downward direction substantially as shown. The second gutter support member 174 is also a substantially L-shaped member having a first leg 182 and a substantially normally disposed second leg 184. The second leg 184 is positioned over the upper cord 30B of the adjustable truss 26B and secured thereto by any suitable means, such as self-tapping, self-drilling screw 185 so that the first leg 182 extends downwardly and substantially parallel to the first leg 178 of the first gutter support member as shown.

The gutter pan 170, a substantially U-shaped member having closure plates secured in the ends thereof, such as closure plate 186, is provided with a first side member 188, a parallel, spatially disposed second side member 190, and a bottom plate 192 interconnecting the lower portions of the first and second side members 188 and 190. The first leg members 178 and 182 of the first and second gutter support members 172, 174, respectively, are each provided with a plurality of substantially vertically disposed elongated slots, such as elongated slots 194, 196 and 198 disposed in the first leg member 178 of the first gutter support member 172 shown in FIG. 9. The gutter pan 170 is connected to the first legs 178 and 182 of the first and second gutter support plates 172, 174, respectively, via a plurality of bolt and nut members 200. The bolt and nut members 200 are positionable through the vertically disposed elongated slots, such as the slots 194, 196 and 198 in the first leg members 178 of the first support plate member 172, and the aligned apertures in the first side 188 of the gutter pan 170. By providing the elongated vertically disposed slots in the first leg members 178, 182 of the first and second support plate members 172 and 174, the gutter pan 170 can be disposed in an angular position such that water collecting therein can be readily delivered to a downspout 201 so that water collecting therein can be readily removed from the roof system. As previously stated, the internal gutter assembly 160 is provided with a linear member 176. The liner member, desirably a flexible, water impervious member, is positioned between the second legs 180, 184 of the first and second support plate members 172 and 174 so that the body portion of the liner member 176 is disposed within, substantially adjacent and supported by the trough formed by the gutter pan 170 and the first leg members 178, 182 of the first and second support plate members 172, 174.

The roof sections 24A and 24B are formed of a plurality of roof panel members, such as roof panel members 42A and 42B. When the roof panel members forming the roof sections 24A and 24B are corrugated or standing seam metal panels, a plug 210 (illustrated in phantom in FIG. 9) is disposed in the end of the corrugation to prevent water from entering the roof system via the corrugation. The plug is embedded in a tape sealant 211 such as illustrated in phantom in FIG. 9.

In order to more fully describe the present invention the method of erection of the improved roof system 10 as shown in FIGS. 1-7 will now be described. In the formation of the roof section 24 on the substantially flat existing roof 12 of the building structure 14, the initial construction procedures involve the removal of any interferring caps and foreign objects which may be connected to the top portion of the wall members of the building structure 14, such as the side wall member 18 and the end wall member 132. Once the upper end portions of the wall members of the building structure 14 have been suitably cleared of any interfering material, the eave connector assembly 134 is secured to the wall member located adjacent the eave portion of the improved roof system 10, such as the end wall member 132. The first leg portion 136 of the eave connector assembly 134 is secured to the inner upper portion of the end wall member 132 by a plurality of self-tapping, self-drilling screws 140, or power driven shot pins, so that the second leg portion 138 of the eave connector assembly 134 is disposed a preselected height above the upper end portion of the end wall member 132.

The next step in the construction of the improved roof system 10 is the erection of the adjustable ridge truss 26 on the existing roof 12 of the building structure 14. The lower cord 28 of the ridge truss 26 is secured to the existing roof 12 by a plurality of self-tapping, self-drilling screws such that the lower cord 28 is disposed substantially parallel to the eave connector assembly 134. The web assembly 32 of the ridge truss 26, which comprises a plurality of spacer trusses 36, is connected to the lower cord 28 and the upper cord 30 so that the upper cord 30 is disposed in a substantially horizontal position at a desired preselected height above the existing roof 12 of the building structure 14. The ridge truss is temporarily braced so that the ridge truss 36 is maintained in its proper position during the operations required in the construction of the improved roof system 10.

The lower cords 28 of the adjustable trusses 26 of the roof section 24 which are disposed between the ridge truss 26 and the wall connector assembly 134 are then positioned upon the existing roof 12 and secured thereto by any suitable means, such as the self-tapping, self-drilling screws 34. The number of adjustable trusses 26 employed in the formation of the roof section 24 will vary depending upon the overall length of the roof section 24, but desirably the adjustable trusses 26 are positioned on the existing roof 12 so as to be spaced approximately five feet apart. Once the lower cord 28 of each of the adjustable trusses have been secured in the desired position on the existing roof 12, a tightline is attached to the top of the eave connector assembly 134 and the top of the upper cord 30 of the ridge truss 26. The web assemblies 32 of each of the adjustable trusses 26 disposed between the ridge truss and the eave connector assembly 134 are then secured to the lower cords 28 and elevated such that upon securing the upper cord 30 to each of the web assemblies 32, the upper cords 30 are positioned so as to be substantially aligned relative to the tightline and in a substantially common plane with the ridge truss and the eave connector assembly 134.

Once the adjustable trusses 26 have been properly positioned on the existing roof 12 of the building structure 14 as described above, the truss spanner member 62 of the roof connector assembly 58 is positioned over the end portions of the upper cords 30 of each of the aligned adjustable trusses 26 forming the roof section 24 so that the truss spanner member 62 extends across the upper cords 30 of each of the adjustable truses 26. If the flexible plastic membrane 102 is to be positioned below the facade panel members 52 of the flashing assembly 50, the first end portion 104 of the flexible membrane 102 is positioned adjacent the upper end portion of the wall member of the building structure 14, such as the wall member 18, and secured thereto via the connector plate 90 of the wall connector assembly 60 and a plurality of self-drilling, self-tapping screws 98. The second end of the flexible membrane 102 is then laid over the truss spanner members 62 and secured to the truss spanner member 62 via the support member 64 and a plurality of self-tapping, self-drilling screws 84 in such a manner that any water penetrating the flashing assembly 50 will be collected and drained to the lower end of the flexible membrane 102 and then out of the building where sections of connector plate 90 join each other end to end or at other suitable locations.

After the flexible membrane 102 has been secured between the wall structure 18 and the truss spanner member 62 as described above, the lower end 56 of each of the facade panel members 52 is connected to the downwardly curved end portion 96 of the wall connector assembly 60 by a plurality of self-tapping, self-drilling screws 98; and the upper end 54 of each of the facade panel members 52 is connected to the arcuate shaped flashing member 77 of the roof connector assembly 58 via a plurality of self-tapping, self-drilling screws 88. During the attachment of the facade panel members to the roof connector assembly 58 and the wall connector assembly 60 as heretofore described, the facade panel members 52 are interconnected to each adjacent facade panel member 52 in the manner heretofore known in the art.

Prior to attaching the roof panel members 42 to the upper cords 30 of the adjustable trusses 26 secured to the existing roof 12 of the building structure 14, the gutter assembly 130 is positioned on the top portion of the end wall member 132. Thereafter, starting with the eave portion of the building structure 14 having the facade panels in place, the roof panel members 42 are positioned across the upper cord 30 of the adjustable truss and secured thereto by a plurality of self-tapping, self-drilling screws 140. It should be noted that by securing the end portions of the roof panel members 42 to the wall connector assembly 134 via the second leg portion 138 thereof and self-drilling, self-tapping screws 140, the gutter assembly 130 is secured in place on the top of the end wall member 130 and below the eave portion of the improved roof system 10.

When the roof section 24 is of substantial length that a plurality of roof panel members 42 are required to extend across the upper cords 30 of the adjustable trusses 26 forming the improved roof systems 10, the roof panel members 42 are overlapped and connected together in a manner heretofore known in the roofing art. The placement of the roof panel members 42 continues across the upper cords 30 of the adjustable trusses 26 until approaching the opposed side of the building structure 14. At this point the flashing assembly 50 is secured to the other side of the building structure 14 and the upper cords 30 of the adjustable trusses 26 via the roof connector assembly 58 heretofore described. Similarly, the flashing assembly 50 interconnects the ridge adjustable truss and the opposed end wall (not shown) of the building structure 14 in a manner similar to that for attaching the facade panel members 52 of the flashing assembly 50 to the wall member 18.

It is often desirable to incorporate additional insulation material, such as insulation 220, on the existing roof 12 of the building structure 14. In such instances, the insulation 220 is positioned on the existing roof 12 prior to attachment of the roof panel members 42 to the upper cords 30 of the adjustable trusses as heretofore described.

The improved roof system 10 as constructed above possesses some unique and advantageous properties other than those heretofore mentioned. For example, the roof panel members 42 are attached directly to the eave connector assembly 134 such that the attachment of the roof panel members 42 thereto serves as a pinned connection. This attachment, in combination with the design of the adjustable trusses 26, and the column strength of roof panel members 42 enables the roof panel members 42 to retain their substantial roof watertightness as the roof panel members 42 expand and contract due to temperature variations. In other words, the unique design of the adjustable trusses 26 is such that there is enough flexibility in the adjustable trusses 26 to allow the trusses to move slightly back and forth as roof panel members 42 moves due to temperature variations, while the pinned connection between roof panel members 42 and the eave connector assembly 134 provide a stable roof system in which the adjustable trusses 26 will not collapse laterally when the roof system 10 is subjected to a load.

The construction of the improved roof system 10 of the present invention has been described above with reference to a roof section 24 having a unidirectional slope substantially as shown in FIG. 1. However, in many instances it is desirable that the improved roof system be constructed such that a plurality of roof sections are connected to form pitched and/or pyramid shaped roof surfaces. In such instances, the basic construction of the roof system is substantially identical as described above except that a plurality of roof sections may be interconnected to form crown portions and eave portions. These crown and eave portions will form valleys which tend to gather water. By incorporating the internal gutter assembly 160 into the improved roof system 10 of the present invention, removal of the water from the water system can be substantially assured. As previously stated, it should be noted that when employing multi-roof sections to form the roof structure having a plurality of pitches or a pyramid shape, the components of the roof system and construction of same is similar to that heretofore described with reference to FIG. 1-7 of the drawings, with the exception of the installation of the internal gutter assembly 160.

To install the internal gutter assembly 160 the first gutter support member 172 is positioned over and secured to the upper cord 30A of the adjustable truss 26A forming the eave truss of the roof section 24A; and the second gutter support member 174 is disposed over and secured to the upper cord 30B of the adjacently disposed adjustable truss 26B serving as the second eave truss for the roof section 2B. The gutter pan 170 is thereafter secured to the first and second gutter support members 172, 174 so as to provide the gutter pan with the desired slope to provide proper drainage of water therethrough. The liner member 176 of the internal gutter assembly 160 is positioned between the first and second support plates 172 and 174 so that the body portion of the liner member 176 is disposed substantially adjacent and supported by the trough formed by the gutter pan 170 and the first and second support plate members 172, 174. One edge of the liner member 176 is positioned over the second leg 180 of the first gutter support member 172 and secured to the second leg 180 and the upper cord 30A of the adjustable truss 26A serving as the eave truss for the roof section 24A via the self-tapping, self-drilling screws 181. Similarly, a second edge portion of the liner member 176 is positioned over the second leg 184 of the second gutter support member 174 and secured to the second leg 184 and the upper cord 30B of the adjustable truss 26B serving as the eave truss for the roof section 24B via the self-tapping, self-drilling screws 185. The downspouts 201 is connected to the gutter pan 170 so as to establish fluid communication therebetween so that water collecting in the gutter pan 170 can pass therefrom via the downspout 201 to an appropriate drain.

It is clear that the present invention is well adapted to carry out the objects and attain the ends and advantages mentioned herein as well as those inherent in the invention. While presently preferred embodiments of the invention have been described for purposes of this disclosure, numerous changes may be made which will readily suggest themselves to those skilled in the art and which are accomplished within the spirit of the invention disclosed and as defined in the appended claims.

What is claimed is:

1. A roof system positionable over an existing roof, the roof system formed of at least one roof section, the roof section of the roof system comprising:

a plurality of adjustable trusses disposed along a preselected section of the existing roof, each of the trusses having a lower cord, a spatially disposed upper cord and an adjustable web assembly interconnecting the lower cord and the upper cord, the lower cord of each truss disposed substantially adjacent the existing roof such that the trusses extend upwardly from the existing roof in a substantially parallel relationship with the adjacently disposed trusses, the web assembly of each of the trusses being adjustable such that the upper cord of each of the trusses is substantially horizontally disposed a selected predetermined height above the existing roof and independent of the slope of the existing roof and the position of the lower cord;

truss fastener means for connecting the lower cord of each of the trusses to the existing roof;

at least one roof panel member supported by the upper cords of the trusses, the roof panel member being disposed to substantially transverse the upper cords of the trusses; and fastener means for connecting the roof panel member to the upper cords of the trusses to form the roof system having a predetermined roof plane substantially independent of the plane of the existing roof.

2. The roof system of claim 1 wherein the adjustable web assembly of the adjustable truss comprises:

a plurality of spacer truss members, each of the spacer truss members having a first end portion and an opposed second end portion;

first connector means for connecting the first end portion of the spacer truss member to the lower cord; and second connector means for connecting the opposed second end portion of the spacer truss members to the upper cord such that the upper cord is maintained in a substantially horizontally disposed position independent of the plane of the longitudinal axis of the lower cord.

3. The roof system of claim 2 wherein the lower cord of each of the adjustable trusses is formed as a plurality of lower cord members so that the lower cord can compensate for variations in the planar surface of the existing roof.

4. The roof system of claim 2 wherein the spacer truss members further comprise:

flange members formed on each of the first and opposed second ends of the spacer truss members, the flange member formed on the first end of the spacer truss member cooperating with the first connector means for connecting the spacer turss members to the lower cord, the flange member formed on the opposed second end of the spacer truss member cooperating with the second connector means for connecting the spacer truss member to the upper cord, the flange members permitting the angular disposition of the spacer truss members to vary with respect to the lower and upper cords such that the upper cord is secured a predetermined distance above the lower cord.

5. The roof system of claim 4 wherein the flange member formed on one of the first and opposed second ends of the spacer truss members is skewed up to about 15 degrees with respect to the longitudinal axis of the spacer truss member.

6. The roof system of claim 1 wherein the existing roof is a substantially flat roof supported by a structure having a first side wall, an opposed second side wall and and end wall, an upper portion of each of the walls of the structure extending the existing substantially flat roof, and wherein the roof system further comprises:

flashing means for interconnecting the upper end portions of at least one of the first side wall to the adjacently disposed roof panel members of the roof section for substantially enclosing the side portion of the roof section.

7. The roof system of claim 6 wherein the flashing means comprises:

a plurality of facade panel members, the facade panel members being interconnected so as to extend substantially along the length of the adjacently disposed roof section, each of the facade panel members having an upper end and an opposed lower end;

roof connector means for connecting the upper end of each of the facade panel members to an adjacently disposed edge portion of the roof panel members forming the roof section; and wall connector means for connecting the lower end of each of the facade panel members to an upper end portion of the adjacently disposed wall of the structure.

8. The roof system of claim 7 further comprises:

a flexible water impervious member extending between and connected to the roof connector means and the wall connector means such that the flexible water impervious membrane is positioned underneath the facade panel member.

9. The roof system of claim 7 wherein the roof connector means comprises:

a support assembly having a first leg portion, a body portion and a second leg portion, the first leg portion of the support assembly positionable on the upper cords such that the body portion of the support member is substantially normally disposed to the upper cords and the second end portion of the support member extends outwardly from the ends of the upper cords, the support assembly further characterized as having an upwardly turned arcuate shaped member formed on the second end portion thereof; and means for connecting the support assembly to the upper cords.

10. The roof system of claim 9 wherein the roof connector means further comprises:

a truss spanner member having a first leg portion and a substantially normally disposed second leg portion, the truss spanner member positionable over adjacent end portions of the upper cords of the adjustable trusses of the roof section such that the first leg portion is disposed substantially adjacent an upper surface of the upper cords and the second leg substantially abuts the end portions of the upper cords.

11. The roof system of claim 7 wherein the wall connector means comprises:

a connector plate having a first end portion, a body portion, and a downwardly curved second end portion, the connector plate being disposed over the wall member such that the first end portion of the connector plate abutts the wall and the body portion and downwardly curved end portion of the connector place are disposed above the wall member; and means for connecting the first end portion of the connector plate to the wall.

12. The roof system of claim 6 further comprising:

eave connector means for interconnecting the upper end of the end wall of the structure to the adjacently disposed portion of the roof panel members of the roof section.

13. The roof system of claim 12 wherein the eave connector means comprises:

a plate member having a first leg portion and a second leg portion, the first leg portion being disposed substantially adjacent an interior upper portion of the end wall of the structure at a position above the existing roof such that the second leg portion extends above the end wall and is adapted to receive and support the roof panel members of the roof section forming the eave;

means for connecting the first leg portion of the plate member to the end wall; and means for connecting the roof panel members to the second leg portion of the plate member.

14. The roof system of claim 13 further comprising external gutter means connected to the second leg portion of the plate member for disposing of water draining from the roof section.

15. The roof section of claim 14 wherein the external gutter means comprises:
a trough member extending substantially the length of the eave portion of the roof section, the trough member having a first side, a spatially disposed second side, a bottom plate disposed between and interconnecting the first and second sides, and an upper flange connected to an upper end of the first side, the upper flange disposable adjacent the second leg of the wall connector and secured therefor via the roof screw means; and
a downspout member connected to the bottom plate so as to establish fluid communication with the trough member.

16. The roof system of claim 1 wherein the roof system is formed of a plurality of roof sections so that the roof system is characterized as being a multi-pitched roof system, and wherein at least two roof sections are adjacently disposed in a spatial relationship so as to form a valley therebetween, and wherein the roof system further comprises:
internal gutter means disposed within the valley and connected to the adjacently disposed roof section forming the valley for removing water deposited on the roof section.

17. The roof system of claim 16 wherein the internal gutter means comprises:
a first gutter support member having a first leg and a substantially normally disposed second leg;
a first connector assembly for connecting the second leg of the first gutter support member to the adjacently disposed upper cord of one of the roof sections such that the first leg extends downwardly into the valley;
a second gutter support member having a first leg and a substantially normally disposed second leg;
a second connector assembly for connecting the second leg of the second gutter support to the adjacently disposed upper cord of the other of the roof sections such that the first leg extends downwardly into the valley in a substantially parallel spatial relationship with the first leg of the first gutter support member;
a gutter pan disposable between the first legs of the first and second gutter support members;
an adjustable gutter pan connector assembly for connecting the gutter pan to the first legs of the first and second gutter support members such that the gutter pan is provided with a desired slope to ensure drainage of water collected in the gutter pan; and
a downspout connected to and in fluid communication with the gutter pan to deliver water from the pan to a disposal area.

18. The roof system of claim 17 wherein the internal gutter means comprises:
a flexible, water impervious liner member disposed within the gutter pan, the flexible water impervious liner member being connected to the adjacently disposed upper cords of the adjacent roof sections.

* * * * *